(12) United States Patent
Zhong et al.

(10) Patent No.: US 9,906,284 B2
(45) Date of Patent: Feb. 27, 2018

(54) BEAM IDENTIFICATION METHOD, RELATED DEVICE AND SYSTEM IN MIMO BEAMFORMING COMMUNICATION SYSTEM

(71) Applicant: ZTE Corporation, Shenzhen (CN)

(72) Inventors: Liyuan Zhong, Shenzhen (CN); Senbao Guo, Shenzhen (CN); Guanghui Yu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/106,453

(22) PCT Filed: May 21, 2014

(86) PCT No.: PCT/CN2014/078040
§ 371 (c)(1),
(2) Date: Jun. 20, 2016

(87) PCT Pub. No.: WO2014/187322
PCT Pub. Date: Nov. 27, 2014

(65) Prior Publication Data
US 2017/0033851 A1    Feb. 2, 2017

(30) Foreign Application Priority Data
Dec. 20, 2013    (CN) .......................... 2013 1 0714138

(51) Int. Cl.
*H04L 1/02*    (2006.01)
*H04B 7/06*    (2006.01)
(Continued)

(52) U.S. Cl.
CPC .......... *H04B 7/0617* (2013.01); *H04B 7/0413* (2013.01); *H04B 7/0619* (2013.01); *H04W 72/044* (2013.01)

(58) Field of Classification Search
CPC ..... H04L 1/0618; H04L 1/06; H04L 25/0204; H04L 27/2647; H04L 5/0007;
(Continued)

(56) References Cited

U.S. PATENT DOCUMENTS 8,660,196 B2    2/2014 Schwager et al.
2010/0295730 A1    11/2010 Jeon
(Continued)

FOREIGN PATENT DOCUMENTS

| CN | 102017447 A | 4/2011 |
| CN | 102326339 A | 1/2012 |
| CN | 102687436 A | 9/2012 |

OTHER PUBLICATIONS

International Search Report in international application No. PCT/CN2014/078040, dated Aug. 22, 2014.
(Continued)

*Primary Examiner* — Zewdu Kassa
(74) *Attorney, Agent, or Firm* — Oppedahl Patent Law Firm LLC

(57) ABSTRACT

The present disclosure discloses a beam identification method in a Multiple-Input Multiple-Output (MIMO) beamforming communication system, which includes that: a Node B sends multiple beam training signals to a terminal, each beam training signal corresponding to a beam and the beams covering different directions; the terminal detects the beam training signals, determines a selected beam according to a detection result, and feeds back indication information about the selected beam to the Node B; and the Node B determines a beam configured to send data information according to the indication information, fed back by the terminal, about the selected beam. The present disclosure further discloses beam identification related device and system in an MIMO beamforming communication system.

11 Claims, 7 Drawing Sheets a Node B sends multiple beam training signals to a terminal — 201 the Node B determines a beam configured to send data information according to indication information, fed back by the terminal, about the selected beam — 202

(51) Int. Cl.
*H04B 7/0413* (2017.01)
*H04W 72/04* (2009.01)
(58) Field of Classification Search
CPC ............. H04L 27/2657; H04L 27/2662; H04L 5/0048; H04L 25/4902; H04L 1/0009; H04L 1/0041; H04L 25/49; H04B 7/0417; H04B 7/0669; H04B 3/54
USPC ........................................ 375/267, 260, 259
See application file for complete search history.

(56) References Cited

U.S. PATENT DOCUMENTS

| | | |
|---|---|---|
| 2012/0122392 A1 | 5/2012 | Morioka |
| 2012/0257683 A1 | 10/2012 | Schwager |
| 2013/0065622 A1* | 3/2013 | Hwang ................ H04W 16/28 455/500 |
| 2013/0107974 A1 | 5/2013 | Schwager et al. |
| 2015/0289147 A1* | 10/2015 | Lou ..................... H04B 7/0408 370/329 |

OTHER PUBLICATIONS

English Translation of the Written Opinion of the International Search Authority in international application No. PCT/CN2014/078040, dated Aug. 22, 2014.

\* cited by examiner

Training frequency-domain unit

BEAM IDENTIFICATION METHOD, RELATED DEVICE AND SYSTEM IN MIMO BEAMFORMING COMMUNICATION SYSTEM

TECHNICAL FIELD

The present disclosure relates to a Multiple-Input Multiple-Output (MIMO) beamforming communication technology, and more particularly, to a beam identification method, related device and system in an MIMO beamforming communication system.

BACKGROUND

In future wireless communications, a carrier frequency higher than a carrier frequency adopted in a 4th-Generation (4G) communication system may be adopted for communications, such as 28 GHz and 38 GHz, and such a high-frequency channel has shortcomings of higher free transmission loss, high oxygen absorption rate, great influence of rain fade and the like, and seriously influences coverage performance of a high-frequency communication system. However, a carrier frequency corresponding to high-frequency communication has a shorter wavelength, so that more antenna elements may be accommodated on a unit area; and accommodation of more antenna elements means that an antenna gain may be improved by adopting a beamforming method, so that coverage performance of high-frequency communications is ensured.

After a beamforming method is adopted, a transmitter may concentrate transmission energy in a certain direction while there is little or no energy in another direction, that is, each beam has own directivity, as shown in FIG. 1, each beam may only cover terminals in a certain direction, and the transmitter, i.e. a Node B, is required to transmit multiple beams to implement omnidirectional coverage. However, before a Node B establishes a connection with a terminal, the Node B cannot know a position of the terminal, and can also not know channel state information between the Node B and the terminal, so that the Node B does not know which beam may cover the terminal; similarly, the terminal also does not know a direction in which a signal may be sent to cover the Node B. From a previous design concept of a Long Term Evolution (LTE) system, it can be seen that it is necessary to accurately acquire the channel state information between the Node B and the terminal so as to obtain a beamforming weight in the channel state information to achieve a good beamforming effect. For obtaining a better beamforming weight, a receiver, i.e. the terminal, is required to measure and feed back downlink channel state information or weight for a transmitter, i.e. the Node B; and the transmitter, i.e. the Node B, is required to measure and feed back uplink channel state information or weight for the receiver, i.e. the terminal, so that it is ensured that the Node B may send a downlink service by adopting an optimal beam and the terminal may also send an uplink service by adopting an optimal beam. However, under such a condition, when a high carrier frequency is adopted for communications, the Node B cannot cover the terminal by virtue of the optimal beam before obtaining the beamforming weight, so that the terminal cannot perform measurement by virtue of a reference signal sent by the Node B; or, even though the Node B covers the terminal, the terminal cannot reach coverage the same as that of the Node B, so that the Node B cannot acquire a content fed back by the terminal, and the Node B cannot perform beamforming weight selection and normal communications.

Therefore, how to obtain an optimal beam of a corresponding terminal by a Node B is a problem to be solved in high-frequency communications.

SUMMARY

In order to solve an existing technical problem, embodiments of the present disclosure provide a beam identification method, related device and system in an MIMO beamforming communication system.

An embodiment of the present disclosure provides a beam identification method at a Node B side in an MIMO beamforming communication system, which includes that:

a Node B sends multiple beam training signals to a terminal, each beam training signal corresponding to a beam and the beams covering different directions; and the Node B determines a beam configured to send data information according to indication information, fed back by the terminal, about the selected beam.

In the solution, the step that the Node B sends the multiple beam training signals may include that:

the Node B sends the multiple beam training signals in at least one of a time division manner, a frequency division manner, a time-domain differential manner and a frequency-domain differential manner, wherein the step that the Node B sends the multiple beam training signals in the time division manner may be implemented as follows:

the Node B sends the multiple beam training signals at different time-domain positions, each beam corresponding to a time-domain position;

the step that the Node B sends the multiple beam training signals in the frequency division manner may be implemented as follows:

the Node B sends the multiple beam training signals at different frequency-domain positions, each beam corresponding to a frequency-domain position;

the step that the Node B sends the multiple beam training signals in the time-domain differential manner may be implemented as follows:

the Node B sends the multiple beam training signals in different time-domain intervals, each beam corresponding to a time-domain interval; and the step that the Node B sends the multiple beam training signals in the frequency-domain differential manner may be implemented as follows:

the Node B sends the multiple beam training signals in different frequency-domain intervals, each beam corresponding to a frequency-domain interval.

In the solution, the step that the Node B sends the multiple beam training signals in different time-domain intervals may include that:

the Node B periodically sends the multiple beam training signals, each beam training signal corresponding to a sending period; or, the beam training signals corresponding to each beam are sent twice in a training period, each beam training signal sent twice being sent at a time-domain interval and different beams corresponding to different time-domain intervals.

In the solution, the time-domain intervals between different beams may be unequal to the training period and the time-domain interval corresponding to any beam.

In the solution, the number of the beams corresponding to the beam training signals sent by the Node B may be smaller than or equal to a maximum beam number supported by the Node B.

In the solution, the indication information about the selected beam may be a beam index corresponding to the selected beam, or may be information capable of identifying the beam index corresponding to the selected beam.

In the solution, the information capable of identifying the beam index corresponding to the selected beam may include: at least one of a time-domain position index, a frequency-domain position index, a time-domain interval index and a frequency-domain interval index.

In the solution, when the indication information about the selected beam is the information capable of identifying the beam index corresponding to the selected beam, the step that the Node B determines the beam configured to send the data information according to the indication information, fed back by the terminal, about the selected beam may include that:

the Node B determines the beam configured to send the data information according to a stored corresponding relationship between information capable of identifying a beam index corresponding to a selected beam and the beam index.

An embodiment of the present disclosure further provides a beam identification method at a terminal side in an MIMO beamforming communication system, which includes that:

a terminal detects beam training signals; and a selected beam is determined according to a detection result of the beam training signals, and indication information about the selected beam is fed back to a Node B.

An embodiment of the present disclosure further provides a beam identification method in an MIMO beamforming communication system, which includes that:

a Node B sends multiple beam training signals to a terminal, each beam training signal corresponding to a beam and the beams covering different directions;

the terminal detects the beam training signals, determines a selected beam according to a detection result of the beam training signals, and feeds back indication information about the selected beam to the Node B; and the Node B determines the beam configured to send data information according to the indication information, fed back by the terminal, about the selected beam.

An embodiment of the present disclosure further provides a Node B in an MIMO beamforming communication system, which may include: a first sending unit, a receiving unit and a first determination unit, wherein the first sending unit is configured to send multiple beam training signals to a terminal, each beam training signal corresponding to a beam and the beams covering different directions; and the receiving unit is configured to receive indication information, fed back by the terminal, about a selected beam; and the first determination unit is configured to determine the beam configured to send data information according to the fed-back indication information about the selected beam.

In the solution, the step that the multiple beam training signals are sent may include that:

the multiple beam training signals are sent in at least one of a time division manner, a frequency division manner, a time-domain differential manner and a frequency-domain differential manner, wherein the step that the multiple beam training signals are sent in the time division manner may be implemented as follows:

the multiple beam training signals are sent at different time-domain positions, each beam corresponding to a time-domain position;

the step that the multiple beam training signals are sent in the frequency division manner may be implemented as follows:

the multiple beam training signals are sent at different frequency-domain positions, each beam corresponding to a frequency-domain position;

the step that the multiple beam training signals are sent in the time-domain differential manner may be implemented as follows:

the multiple beam training signals are sent in different time-domain intervals, each beam corresponding to a time-domain interval; and the step that the multiple beam training signals are sent in the frequency-domain differential manner may be implemented as follows:

the multiple beam training signals are sent in different frequency-domain intervals, each beam corresponding to a frequency-domain interval.

In the solution, the number of the beams corresponding to the sent beam training signals may be smaller than or equal to a maximum beam number supported by the Node B.

An embodiment of the present disclosure further provides a terminal in an MIMO beamforming communication system, which may include: a detection unit, a second determination unit and a second sending unit, wherein the detection unit is configured to detect beam training signals;

the second determination unit is configured to determine a selected beam according to a detection result of the beam training signals; and the second sending unit is configured to feed back indication information about the selected beam to a Node B.

An embodiment of the present disclosure further provides a beam identification system in an MIMO beamforming communication system, which may include: a Node B and a terminal, wherein the Node B is configured to send multiple beam training signals to the terminal, each beam training signal corresponding to a beam and the beams covering different directions, and determine a beam configured to send data information according to indication information, fed back by the terminal, about the selected beam; and the terminal is configured to detect the beam training signals, determine the selected beam according to a detection result of the beam training signals, and feed back the indication information about the selected beam to the Node B.

An embodiment of the present disclosure further provides a computer storage medium, which may include a set of instructions, the instructions being executed to cause at least one processor to execute the abovementioned beam identification method at a Node B side in the MEMO beamforming communication system, or execute the abovementioned beam identification method at a terminal side in the MIMO beamforming communication system, or execute the beam identification method in the MIMO beamforming communication system.

According to the beam identification method, related device and system in the MIMO beamforming communication system provided by the embodiment of the present disclosure, the Node B sends the multiple beam training signals to the terminal, each beam training signal corresponding to a beam and the beams covering different directions; the terminal detects the beam training signals, determines the selected beam according to the detection result of the beam training signals, and feeds back the indication information about the selected beam to the Node B; and the Node B determines the beam configured to send the data information according to the indication information, fed back by the terminal, about the selected beam. In such a manner, an optimal beam for sending the information may be effectively identified, thereby further implementing a beam training process and enabling the Node B to obtain an optimal beam weight of the terminal and send data to the terminal by adopting the optimal beam.

BRIEF DESCRIPTION OF THE DRAWINGS

In the drawings (which may not be drawn to scale), similar drawing reference signs may describe similar parts in different views. Similar drawing reference signs with different suffix letters may represent different examples of similar parts. The drawings substantially show each embodiment discussed in the present disclosure in an exemplary and unlimited manner.

FIG. 5(*b*) is a diagram of temporarily discontinuous training time-domain units in a time division manner-based beam identification method according to embodiment 1 of the present disclosure;

FIG. 8(*b*) is a diagram of training frequency-domain units continuous on a frequency domain in a frequency-domain manner-based beam identification method according to embodiment 4 of the present disclosure;

DETAILED DESCRIPTION

In each embodiment of the present disclosure: a Node B sends multiple beam training signals to a terminal, each beam training signal corresponding to a beam and the beams covering different directions; the terminal detects the beam training signals, determines a selected beam according to a detection result of the beam training signals, and feeds back indication information about the selected beam; and the Node B determines the beam configured to send data information according to the indication information about the selected beam fed back by the terminal.

The present disclosure will be further described below with reference to the drawings and specific embodiments in detail.

Figure 1:
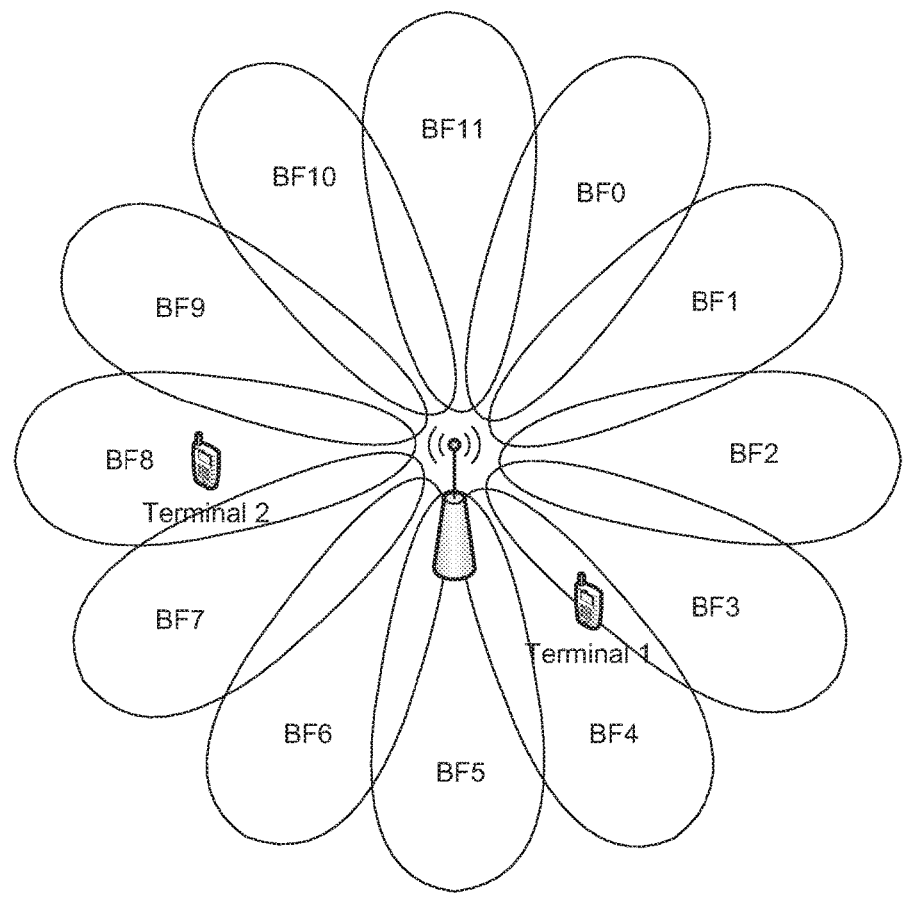
FIG. 1 is a diagram of a beam transmitted by a Node B.
Figure 2:
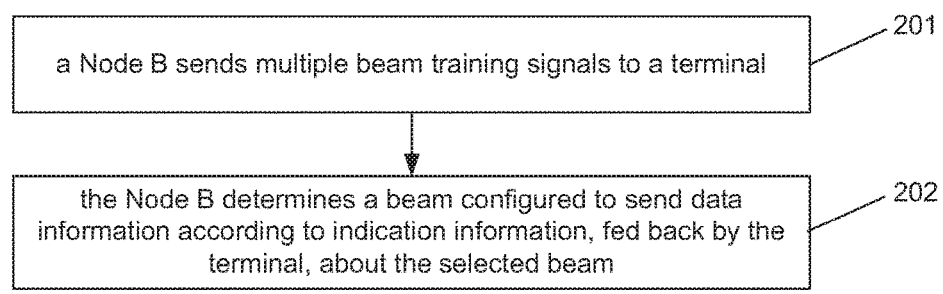
FIG. 2 is a flow chart of a beam identification method at a Node B side in an MIMO beamforming communication system according to an embodiment of the present disclosure.

A beam identification method at a Node B side in an MIMO beamforming communication system in an embodiment of the present disclosure, as shown in FIG. 2, includes the following steps.

Step 201: a Node B sends multiple beam training signals to a terminal, each beam training signal corresponding to a beam and the beams covering different directions.

Wherein, the beam training signals refer to: signals bearing beam, they may have other names, for example: beam testing signals, and signals capable of achieving a purpose the same as that achieved by the beam training signals in the present disclosure shall fall within the scope of protection of the present disclosure.

The step that the Node B sends the multiple beam training signals specifically includes that:

the Node B sends the multiple beam training signals in at least one of a time division manner, a frequency division manner, a time-domain differential manner and a frequency-domain differential manner, wherein the step that the Node B sends the multiple beam training signals in the time division manner is specifically implemented as follows:

the Node B sends the multiple beam training signals at different time-domain positions, each beam corresponding to a time-domain position;

the step that the Node B sends the multiple beam training signals in the frequency division manner is specifically implemented as follows:

the Node B sends the multiple beam training signals at different frequency-domain positions, each beam corresponding to a frequency-domain position;

the step that the Node B sends the multiple beam training signals in the time-domain differential manner is specifically implemented as follows:

the Node B sends the multiple beam training signals in different time-domain intervals, each beam corresponding to a time-domain interval; and the step that the Node B sends the multiple beam training signals in the frequency-domain differential manner is specifically implemented as follows:

the Node B sends the multiple beam training signals in different frequency-domain intervals, each beam corresponding to a frequency-domain interval.

Wherein, the step that the Node B sends the multiple beam training signals in different time-domain intervals specifically includes that:

the Node B periodically sends the multiple beam training signals, each beam training signal corresponding to a sending period; or, the beam training signals corresponding to each beam are sent twice in a training period, each beam training signal sent twice being sent at a time-domain interval and different beams corresponding to different time-domain intervals.

Here, the time-domain intervals between different beams are unequal to the training period and the time-domain interval corresponding to any beam.

The number of the beams corresponding to the beam training signals sent by the Node B is smaller than or equal to a maximum beam number supported by the Node B; correspondingly, the number of the time-domain positions configured to send the beam training signals is smaller than or equal to the maximum beam number supported by the Node B; the number of the frequency-domain positions configured to send the beam training signals is smaller than or equal to the maximum beam number supported by the Node B; the number of the time-domain intervals configured to send the beam training signals is smaller than or equal to the maximum beam number supported by the Node B; and the number of the frequency-domain intervals configured to send the beam training signals is smaller than or equal to the maximum beam number supported by the Node B.

Here, during a practical application, the manner adopted for sending the beam training signals by the Node B may be determined as required.

Step 202: the Node B determines a beam configured to send data information according to indication information, fed back by the terminal, about the selected beam.

Here, the indication information about the selected beam may specifically be: a beam index corresponding to the selected beam or information capable of identifying the beam index corresponding to the selected beam; wherein the information capable of identifying the beam index corresponding to the selected beam includes: at least one of a time-domain position index, a frequency-domain position index, a time-domain interval index and a frequency-domain interval index. Specifically, when the Node B sends the multiple beam training signals in the time division manner, the information capable of identifying the beam index corresponding to the selected beam is a time-domain position index; when the Node B sends the multiple beam training signals in the frequency division manner, the information capable of identifying the beam index corresponding to the selected beam is a frequency-domain position index; when the Node B sends the multiple beam training signals in the time-domain differential manner, the information capable of identifying the beam index corresponding to the selected beam is a time-domain interval index; when the Node B sends the multiple beam training signals in the frequency-domain differential manner, the information capable of identifying the beam index corresponding to the selected beam is a frequency-domain interval index; and when the Node B sends the multiple beam training signals in the time division manner and the frequency division manner, the information capable of identifying the beam index corresponding to the selected beam is a time-domain position index and a frequency-domain position index, and so on.

When the indication information about the selected beam is the information capable of identifying the beam index corresponding to the selected beam, the step that the Node B determines the beam configured to send the data information according to the indication information, fed back by the terminal, about the selected beam specifically includes that:

the Node B determines the beam configured to send the data information according to a stored corresponding relationship between information capable of identifying a beam index corresponding to a selected beam and the beam index.

Wherein, the selected beam may be a beam with optimal receiving performance and the like; here, the beam with the optimal receiving performance may be determined as required; and a specific processing process of determining the beam with the optimal receiving performance is a common technical means adopted by those skilled in the art, and will not be elaborated.

Figure 3:
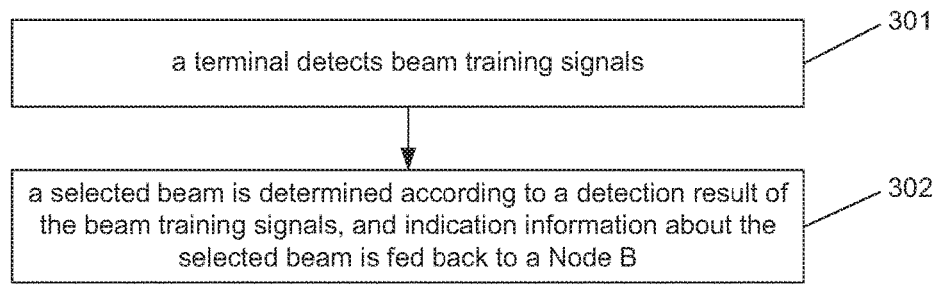
FIG. 3 is a flow chart of a beam identification method at a terminal side in an HMO beamforming communication system according to an embodiment of the present disclosure.

A beam identification method at a terminal side in an MIMO beamforming communication system in an embodiment of the present disclosure, as shown in FIG. 3, includes the following steps.

Step 301: a terminal detects beam training signals.

Here, specific implementation of the step is a common technical means adopted by those skilled in the art, and will not be elaborated.

Step 302: a selected beam is determined according to a detection result of the beam training signals, and indication information about the selected beam is fed back to a Node B.

Wherein, the beam training signals refer to: signals bearing beam, they may have other names, for example: beam testing signals, and signals capable of achieving a purpose the same as that achieved by the beam training signals in the present disclosure shall fall within the scope of protection of the present disclosure.

Here, during a practical application, the terminal acquires a manner for determining the selected beam in advance.

The indication information about the selected beam may specifically be: a beam index corresponding to the selected beam or information capable of identifying the beam index corresponding to the selected beam, wherein the information capable of identifying the beam index corresponding to the selected beam includes: at least one of a time-domain position index, a frequency-domain position index, a time-domain interval index and a frequency-domain interval index.

Wherein, the selected beam may be a beam with optimal receiving performance and the like; here, the beam with the optimal receiving performance may be determined as required; and a specific processing process of determining the beam with the optimal receiving performance is a common technical means adopted by those skilled in the art, and will not be elaborated.

Figure 4:
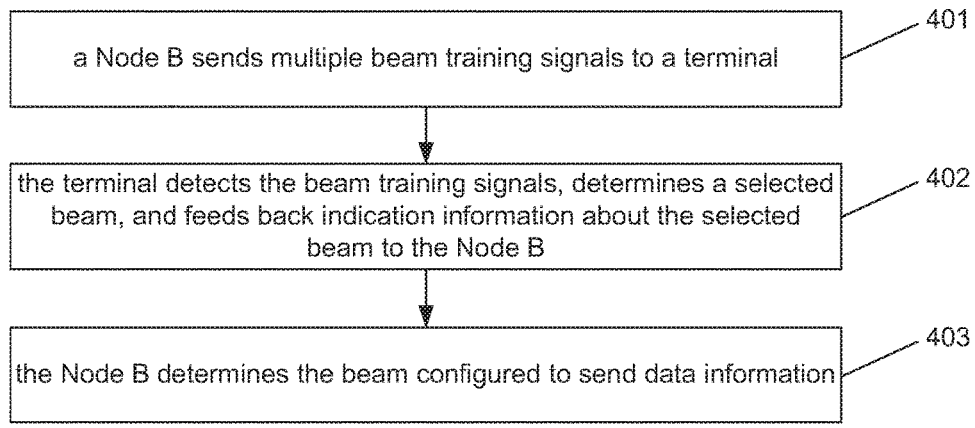
FIG. 4 is a flow chart of a beam identification method in an MIMO beamforming communication system according to an embodiment of the present disclosure.

A beam identification method in an MIMO beamforming communication system in an embodiment of the present disclosure, as shown in FIG. 4, includes the following steps.

Step 401: a Node B sends multiple beam training signals to a terminal, each beam training signal corresponding to a beam and the beams covering different directions.

Here, the beam training signals refer to: signals bearing beam, they may have other names, for example: beam testing signals, and signals capable of achieving a purpose the same as that achieved by the beam training signals in the present disclosure shall fall within the scope of protection of the present disclosure.

The step that the Node B sends the multiple beam training signals specifically includes that:

the Node B sends the multiple beam training signals in at least one of a time division manner, a frequency division manner, a time-domain differential manner and a frequency-domain differential manner, wherein the step that the Node B sends the multiple beam training signals in the time division manner is specifically implemented as follows:

the Node B sends the multiple beam training signals at different time-domain positions, each beam corresponding to a time-domain position;

the step that the Node B sends the multiple beam training signals in the frequency division manner is specifically implemented as follows:

the Node B sends the multiple beam training signals at different frequency-domain positions, each beam corresponding to a frequency-domain position;

the step that the Node B sends the multiple beam training signals in the time-domain differential manner is specifically implemented as follows:

the Node B sends the multiple beam training signals in different time-domain intervals, each beam corresponding to a time-domain interval; and the step that the Node B sends the multiple beam training signals in the frequency-domain differential manner is specifically implemented as follows:

the Node B sends the multiple beam training signals in different frequency-domain intervals, each beam corresponding to a frequency-domain interval.

Wherein, the step that the Node B sends the multiple beam training signals in different time-domain intervals specifically includes that:

the Node B periodically sends the multiple beam training signals, each beam training signal corresponding to a sending period; or, the beam training signals corresponding to each beam are sent twice in a training period, each beam training signal sent twice being sent at a time-domain interval and different beams corresponding to different time-domain intervals.

Here, the time-domain intervals between different beams are unequal to the training period and the time-domain interval corresponding to any beam, so that mistaken detection of the terminal may be effectively avoided.

The number of the beams corresponding to the beam training signals sent by the Node B is smaller than or equal to a maximum beam number supported by the Node B; correspondingly, the number of the time-domain positions configured to send the beam training signals is smaller than or equal to the maximum beam number supported by the Node B; the number of the frequency-domain positions configured to send the beam training signals is smaller than or equal to the maximum beam number supported by the Node B; the number of the time-domain intervals configured to send the beam training signals is smaller than or equal to the maximum beam number supported by the Node B; and the number of the frequency-domain intervals configured to send the beam training signals is smaller than or equal to the maximum beam number supported by the Node B.

Here, during a practical application, the manner adopted for sending the beam training signals by the Node B may be determined as required.

Step 402: the terminal detects the beam training signals, determines a selected beam according to a detection result of the beam training signals, and feeds back indication information about the selected beam to the Node B.

Here, during a practical application, the terminal acquires the manner adopted for sending the beam training signals by the Node B in advance, and further acquires which manner a manner should be adopted to determine the selected beam.

The indication information about the selected beam may specifically be: a beam index corresponding to the selected beam or information capable of identifying the beam index corresponding to the selected beam, wherein the information capable of identifying the beam index corresponding to the selected beam includes: at least one of a time-domain position index, a frequency-domain position index, a time-domain interval index and a frequency-domain interval index.

Wherein, the selected beam may be a beam with optimal receiving performance and the like; here, the beam with the optimal receiving performance may be determined as required; and a specific processing process of determining the beam with the optimal receiving performance is a common technical means adopted by those skilled in the art, and will not be elaborated.

Step 403: the Node B determines the beam configured to send data information according to the indication information, fed back by the terminal, about the selected beam.

Here, when the indication information about the selected beam is the information capable of identifying the beam index corresponding to the selected beam, the step that the Node B determines the beam configured to send the data information according to the indication information, fed back by the terminal, about the selected beam specifically includes that:

the Node B determines the beam configured to send the data information according to a stored corresponding relationship between information capable of identifying a beam index corresponding to a selected beam and the beam index.

Embodiment 1

Figure 5A:
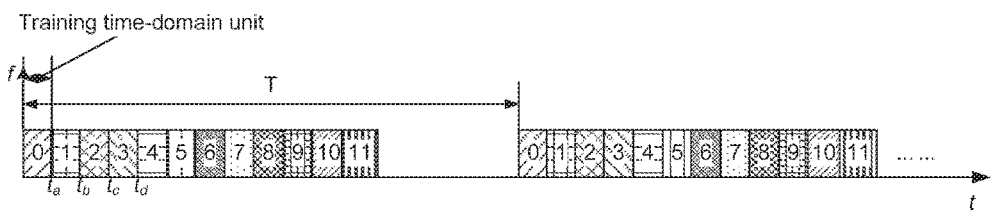
FIG. 5(*a*) is a diagram of temporarily continuous training time-domain units in a time division manner-based beam identification method according to embodiment 1 of the present disclosure.
Figure 5B:
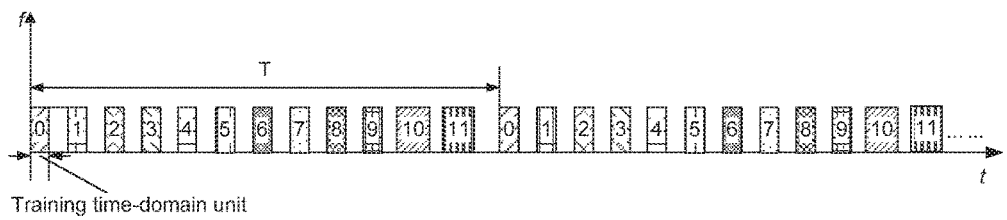

In the embodiment, it is supposed that a maximum beam number supported by a Node B is N, each beam is periodically sent, the N beams correspond to the same sending period, N training time-domain units are divided in each sending period, the N training time-domain units form a training period, each training time-domain unit corresponds to a beam, each training time-domain unit corresponds to an index number, for example, N=12 here, as shown in FIG. 5(a) and FIG. 5(b). Adjacent training time-domain units may be temporally continuous, as shown in FIG. 5(a); and adjacent training time-domain units may also be temporally spaced by certain intervals, as shown in FIG. 5(b).

If a beam sending period is T, T≥N*t, so that sufficient time for sending once beam training signals in each direction supported by the Node B in each sending period is ensured, wherein t represents a training time-domain unit, and the beam training signals in corresponding directions are sent in the training time-domain units.

Frequency-domain resources for the beam training signals are fixed, for example: middle positions of a bandwidth, and their sizes are equal to a minimum bandwidth supported by a high-frequency communication protocol.

For a transmitter, i.e. the Node B, before sending the beam training signals, the Node B determines the number, supposed to be M, of beams to be sent at first, M≤N, and then selects M training time-domain units from the N training time-domain units to send the beam training signals. It is supposed that M=12, numbers on the training time-domain units in FIG. 5(a) and FIG. 5(b) represent beam indexes, and in a training period, beam 0~beam 11 correspond to the first~12th training time-domain units respectively. Here, a specific processing process of determining the number of the beams to be sent by the Node B is not a concern in the present disclosure.

For a receiver, i.e. a terminal, before receiving the beam training signals, the terminal performs downlink synchronization to implement time-domain and frequency-domain synchronization and obtain radio frame time at first, then performs related peak detection on the N training time-domain units to find a beam with optimal receiving performance as a selected beam, and feeds back indication information about the selected beam to the Node B.

Wherein, if the terminal acquires a corresponding relationship between a time-domain position and a beam index in advance, the terminal may find a beam index corresponding to a time-domain position of the selected beam according to the acquired corresponding relationship between the time-domain position and the beam index, and feed back the found beam index to the Node B. For example, as shown in FIG. 5(a) and FIG. 5(b), if the terminal detects that the selected beam is positioned between $t_b$ and $t_c$, it may be obtained that the corresponding beam index is 2 according to the acquired corresponding relationship between the time-domain position and the beam index, the terminal feeds back the beam index 2 to the Node B, and the Node B acquires an optimal downlink sending beam for the terminal after correctly receiving the feedback of the terminal.

If the terminal does not acquire the corresponding relationship between the time-domain position and the beam index in advance, the terminal is required to feed back information capable of identifying the beam index, and for example: feed back an index number of the training time-domain unit corresponding to the selected beam, or feed back a serial number of an Orthogonal Frequency Division Multiplexing (OFDM) symbol where the training time-domain unit corresponding to the selected beam is located, a micro frame number, a subframe number, a timeslot number or the like; correspondingly, the Node B finds the time-domain position corresponding to the selected beam according to the fed back content after receiving the feedback of the terminal, and further finds the corresponding beam index according to the time-domain position; in such a manner, the Node B obtains the optimal downlink sending beam for the terminal.

From the above, according to the beam identification method in the embodiment, the Node B sends the beam training signals at different time-domain positions, and the terminal feeds back the indication information capable of identifying the time-domain position corresponding to the selected beam to the Node B to enable the Node B to obtain the optimal downlink sending beam corresponding to the terminal, so that the beam identification method of the embodiment may be considered as a time division manner-based beam identification method.

Embodiment 2

Figure 6:
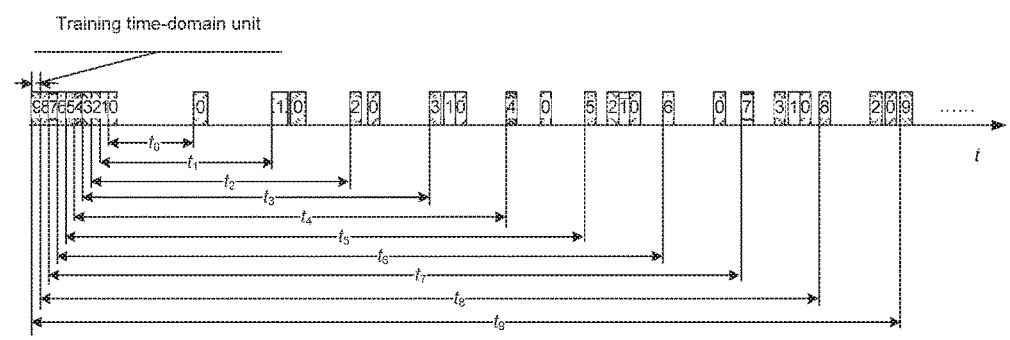
FIG. 6 is a diagram of training time-domain units in a time-domain differential manner-based beam identification method according to embodiment 2 of the present disclosure.

In the embodiment, it is supposed that a maximum beam number supported by a Node B is N, each beam is periodically sent, but the beams correspond to different sending periods, that is, there exist N different sending periods corresponding to the N beams respectively, and the N sending periods are recorded as $t_0 \sim t_{N-1}$ respectively. One training time-domain unit is divided in each of the N sending periods, and each training unit corresponds to an index number. The sending period of each beam may also be called a sending time interval of the beam, and there are totally N different time intervals. In order to avoid inter-beam mistaken detection, it is necessary to ensure that the time intervals between different beams are unequal to the sending period of any beam; for example, if there are two beams, i.e. a first beam and a second beam, a sending period of the first beam is 5 ms and a sending period of the second beam is 10 ms, in order to avoid mistaken detection, it is necessary to ensure that the time intervals of the first beam and the second beam are unequal to 5 ms and 10 ms. As shown in FIG. 6, for example, N=10, and sending periods of beam 0~beam 9 are $t_0 \sim t_9$ respectively.

Adjacent training time-domain units may be temporally continuous, and may also be temporally spaced by certain intervals. Beam training signals in corresponding directions are sent in the training time-domain units.

Frequency-domain resources (including sizes and positions) for the beam training signals are fixed, for example: middle positions of a bandwidth, and their sizes are equal to a minimum bandwidth supported by a high-frequency communication protocol.

For a transmitter, i.e. the Node B, before sending the beam training signals, the Node B determines the number, supposed to be M, of beams to be sent at first, M≤N, then selects M sending periods from the N sending periods, each beam corresponding to a sending period and M beams corresponding to the M different sending periods respectively, and sends the beam training signals on the training time-domain units corresponding to each sending period according to the corresponding sending periods, one beam being sent on each training time-domain unit. In FIG. 6, the periods corresponding to beam 0 to beam 9 are $t_0 \sim t_9$ respectively, numbers on the training time-domain units in FIG. 6 represent beam indexes, and the beam indexes corresponding to the first~10th training time-domain units respectively. Here, a specific processing process of determining the number of the beams to be sent by the Node B is not a concern in the present disclosure.

For a receiver, i.e. a terminal, the terminal may execute a beam training process before a downlink synchronization process, and may also simultaneously execute the beam training process and the downlink synchronization process. The terminal performs related peak detection on the beam training signals, judges whether a time difference between reception of two related peaks is equal to the predefined beam sending periods, i.e. one of $t_0 \sim t_{N-1}$, after detecting the two related peaks, determines that a detection result is wrong and performs redetection if NO, and determines that the detection result is correct if YES. For example, as shown in FIG. 6, the terminal judges whether the time difference between reception of the two related peaks is equal to one of $t_0 \sim t_9$, and determines that the detection result is correct if YES. If the detection result is correct, the terminal determines the current beam of which the detection result is correct as a selected beam, and feeds back indication information about the selected beam to the Node B.

Wherein, if the terminal acquires a corresponding relationship between a sending period and a beam index in advance, the terminal may find a beam index corresponding to the time difference between reception of the two related peaks according to the acquired corresponding relationship between the sending period and the beam index, and feed back the found beam index to the Node B. For example, as shown in FIG. 6, if the time difference between reception of the two related peaks is equal to $t_3$, it may be obtained that the corresponding beam index is 3 according to the acquired corresponding relationship between the sending period and the beam index, the terminal feeds back the beam index 3 to the Node B, and the Node B acquires an optimal downlink sending beam for the terminal after correctly receiving the feedback of the terminal.

If the terminal does not acquire the corresponding relationship between the sending period and the beam index in advance, the terminal is required to feed back information capable of identifying the beam index, and for example: feed back another parameter capable of representing a magnitude of the time difference between the two related peaks, and specifically feeds back the magnitude of the time difference between the two related peaks, an index number of the sending period or the like; correspondingly, the Node B finds the corresponding beam index according to the fed back content after receiving the feedback of the terminal, in such a manner, the Node B obtains the optimal downlink sending beam for the terminal.

From the above, according to the beam identification method in the embodiment, the Node B sends the beam training signals in different sending periods, and the terminal feeds back the indication information capable of identifying the sending period corresponding to the time difference between the two related peaks to the Node B to enable the Node B to obtain the optimal downlink sending beam corresponding to the terminal, so that the beam identification method of the embodiment may be considered as a time-domain differential manner-based beam identification method.

Embodiment 3

Figure 7:
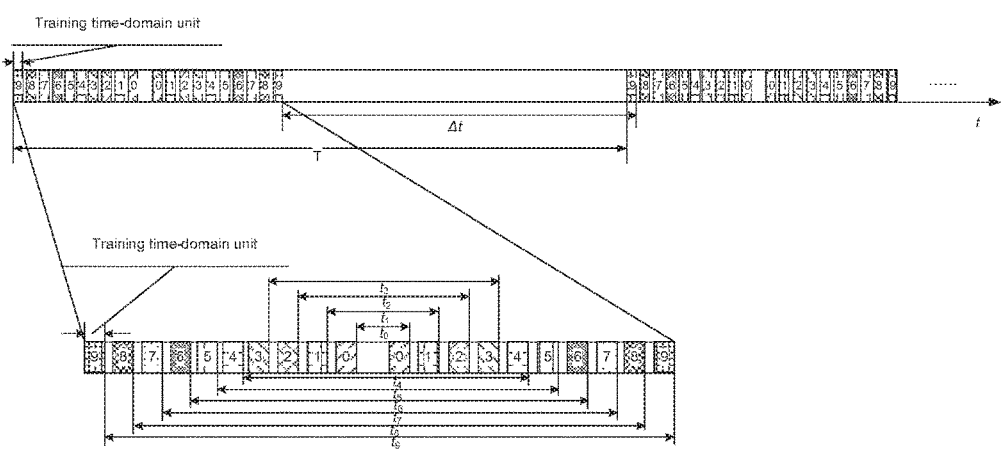
FIG. 7 is a diagram of training time-domain units in a time-domain differential manner-based beam identification method according to embodiment 3 of the present disclosure.

In the embodiment, it is supposed that a maximum beam number supported by a Node B is N, beam training is performed according to a training period, each beam training signal is specifically sent twice in each training period, and time-domain intervals corresponding to twice sending of different beams in the same training period are different; that is, 2N training time-domain units are required to be divided in a training period, every two forms a group, there are totally N groups, each beam corresponds to a group, a time-domain interval of the two training time-domain units in each group is different from those of the other groups, that is, each beam corresponds to a time-domain interval, there are totally N different time-domain intervals, and the N time-domain intervals are recorded as $t_0 \sim t_{N-1}$ respectively. In order to avoid inter-beam mistaken detection, it is necessary to ensure that the time-domain intervals between different beams are unequal to the time-domain interval corresponding to any beam; for example, if there are two beams, i.e. a first beam and a second beam, a time-domain interval of twice sending of a beam training signal for the first beam is 5 ms and a time-domain interval of twice sending of a beam training signal for the second beam is 10 ms, in order to avoid mistaken detection, it is necessary to ensure that the time-domain intervals of the first beam and the second beam are unequal to 5 ms and 10 ms. As shown in FIG. 7, for example, N=10, T is a training period, there are 20 training time-domain units in each period, training time-domain units in the same box shade in FIG. 7 form a group, and time-domain intervals corresponding to the two training time-domain units in each of the first group to the tenth group are $t_0 \sim t_9$ respectively.

Adjacent training time-domain units may be temporally continuous, and may also be temporally spaced by certain intervals. Beam training signals in corresponding directions are sent in the training time-domain units.

Frequency-domain resources(including sizes and positions) for the beam training signals are fixed, for example: the frequency-domain resources for the beam training signals are configured to be middle positions of a bandwidth, and their sizes are equal to a minimum bandwidth supported by a high-frequency communication protocol.

For a transmitter, i.e. the Node B, before sending the beam training signals, the Node B determines the number, supposed to be M, of beams to be sent at first, M≤N, then selects M groups of training time-domain units from the N groups of training time-domain units, each group of training time-domain units corresponding to a beam, and sends the corresponding beam training signals on the corresponding training time-domain units respectively, wherein one beam training signal is sent in each training time-domain unit, so that lengths of the time-domain intervals corresponding to each beam are different in a training period. In FIG. 7, numbers on the training time-domain units represent beam indexes, and each group of training time-domain units corresponds to a beam. Here, a specific processing process of determining the number of the beams to be sent by the Node B is not a concern in the present disclosure.

For a receiver, i.e. a terminal, the terminal may execute a beam training process before a downlink synchronization process, and may also simultaneously execute the beam training process and the downlink synchronization process. The terminal performs related peak detection on the beam training signals, judges whether a time difference between reception of two related peaks is equal to the predefined time-domain intervals, i.e. one of $t_0 \sim t_{N-1}$, after detecting the two related peaks, determines that a detection result is wrong and performs redetection if NO, and determines that the detection result is correct if YES. For example, as shown in FIG. 7, the terminal judges whether the time difference between reception of the two related peaks is equal to one of $t_0 \sim t_9$, determines that the detection result is wrong and performs redetection if NO, and determines that the detection result is correct if YES, and the terminal determines the current beam of which the detection result is correct as a selected beam, and feeds back indication information about the selected beam to the Node B.

Wherein, if the terminal acquires a corresponding relationship between a time-domain interval and a beam index in advance, the terminal may find a beam index corresponding to the time difference between reception of the two related peaks according to the acquired corresponding relationship between the time-domain interval and the beam index, and feed back the found beam index to the Node B. For example, as shown in FIG. 7, if the time difference between reception of the two related peaks is equal to $t_3$, it may be obtained that the corresponding beam index is 3 according to the acquired corresponding relationship between the time-domain interval and the beam index, the terminal feeds back the beam index 3 to the Node B, and the Node B acquires an optimal downlink sending beam for the terminal after correctly receiving the feedback of the terminal.

If the terminal does not acquire the corresponding relationship between the time-domain interval and the beam index in advance, the terminal is required to feed back information capable of identifying the beam index, for example: feed back another parameter capable of representing a magnitude of the time difference between the two related peaks, and specifically feeds back the corresponding time difference between the two related peaks, an index number of the time-domain interval or the like; correspondingly, the Node B finds the corresponding beam index according to the fed back content after receiving the feedback of the terminal, in such a manner, the Node B obtains the optimal downlink sending beam for the terminal.

From the above, according to the beam identification method in the embodiment, the Node B sends the beam training signals at different time-domain intervals, and the terminal feeds back the indication information capable of identifying the time-domain interval corresponding to the time difference between the two related peaks to the Node B to enable the Node B to obtain the optimal downlink sending beam corresponding to the terminal, so that the beam identification method of the embodiment may be considered as a time-domain differential manner-based beam identification method.

Embodiment 4

Figure 8A:
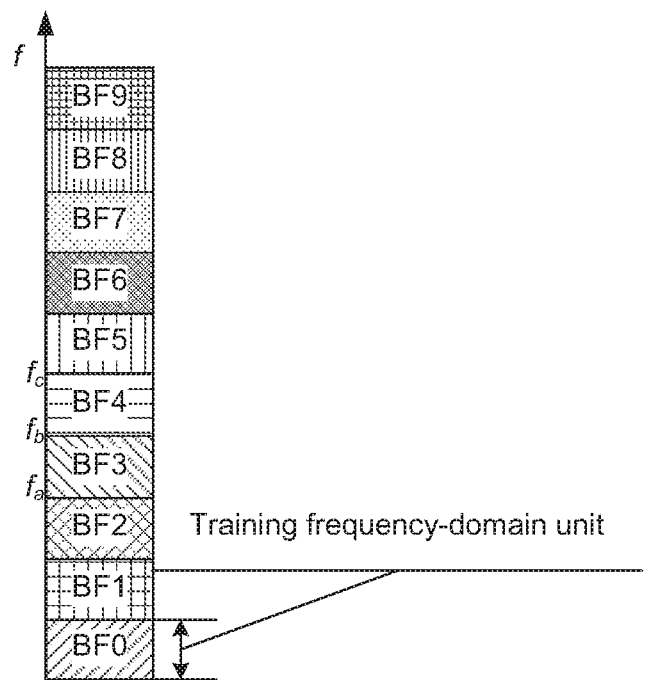
FIG. 8(*a*) is a diagram of training frequency-domain units continuous on a frequency domain in a frequency-domain manner-based beam identification method according to embodiment 4 of the present disclosure.
Figure 8B:
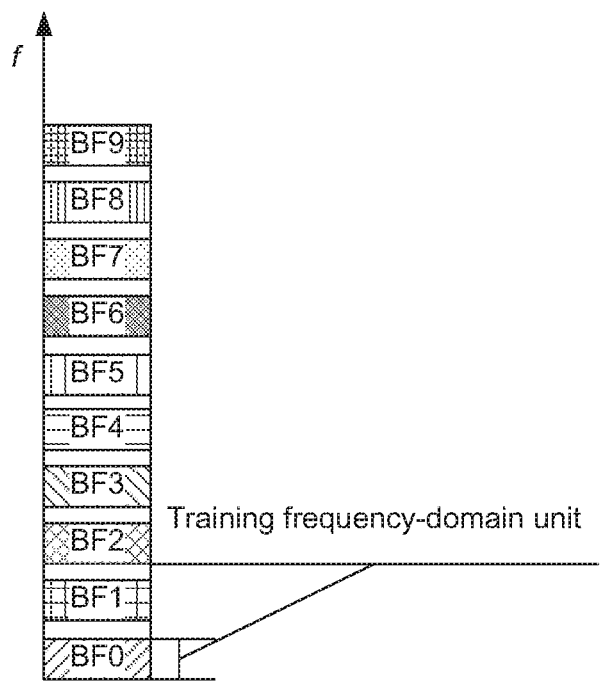
Figure 10:
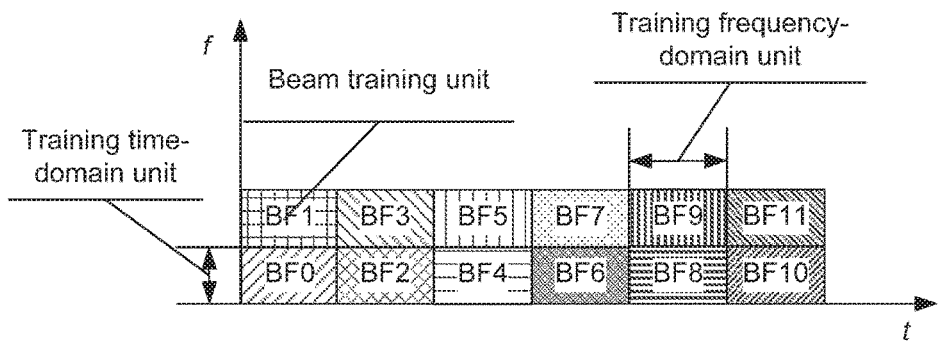
FIG. 10 is a diagram of beam training units in a time division and frequency division manner-based beam identification method according to embodiment 6 of the present disclosure.

In the embodiment, it is supposed that a maximum beam number supported by a Node B is N, N training frequency-domain units are divided on frequency-domain resources, only one beam training signal may be sent on each training frequency-domain unit, and the N training frequency-domain units occupy the same time-domain resource, and are periodically sent on the time domain. For example, N=10 here, as shown in FIG. 8(a) and FIG. 8(b), 10 training frequency-domain units are divided on frequency-domain resources, and beam training signals in corresponding directions are sent on the training frequency-domain units. Adjacent training frequency-domain units may be continuous on the frequency domain, as shown in FIG. 8(a), and adjacent training time-domain units may also be spaced by certain frequency-domain intervals, as shown in FIG. 8(b).

For a transmitter, i.e. the Node B, before sending the beam training signals, the Node B determines the number, supposed to be M, of beams to be sent at first, M≤N, then finds time-frequency positions of the N training frequency-domain units according to preconfigured information, selects M training frequency-domain units and sends the beam training signals on the M training frequency-domain units, wherein only one beam training signal is sent on each training frequency-domain unit when the beam training signals are sent. Here, a specific processing process of determining the number of the beams to be sent by the Node B is not a concern in the present disclosure.

For a receiver, i.e. a terminal, the terminal performs related peak detection on the beam training signals on the N training frequency-domain units to find a beam with optimal receiving performance as a selected beam, and feeds back indication information about the selected beam to the Node B.

Wherein, if the terminal acquires a corresponding relationship between a frequency-domain position and a beam index in advance, the terminal may find a beam index corresponding to a frequency-domain position of the selected beam according to the acquired corresponding relationship between the frequency-domain position and the beam index, and feed back the found beam index to the Node B. For example, as shown in FIG. 8(a) and FIG. 8(b), if the terminal detects that the selected beam is positioned between $f_b$ and $f_c$, it may be obtained that the corresponding beam index is 4 according to the acquired corresponding relationship between the frequency-domain position and the beam index, the terminal feeds back the beam index 4 to the Node B, and the Node B acquires an optimal downlink sending beam for the terminal after correctly receiving the feedback of the terminal.

If the terminal does not acquire the corresponding relationship between the frequency-domain position and the beam index in advance, the terminal is required to feed back information capable of identifying the beam index, for example: feed back an index number of the training frequency-domain unit corresponding to the selected beam, or feed back an index number of a resource block where the training frequency-domain unit corresponding to the selected beam is located and the like; correspondingly, the Node B finds the frequency-domain position corresponding to the selected beam according to the fed back content after receiving the feedback of the terminal, and further finds the corresponding beam index according to the frequency-domain position, in such a manner, the Node B obtains the optimal downlink sending beam for the terminal.

From the above, according to the beam identification method in the embodiment, the Node B sends the beam training signals at different frequency-domain positions, and the terminal feeds back the indication information capable of identifying the frequency-domain position corresponding to the selected beam to the Node B to enable the Node B to obtain the optimal downlink sending beam corresponding to the terminal, so that the beam identification method of the embodiment may be considered as a frequency division manner-based beam identification method.

Embodiment 5

Figure 9:
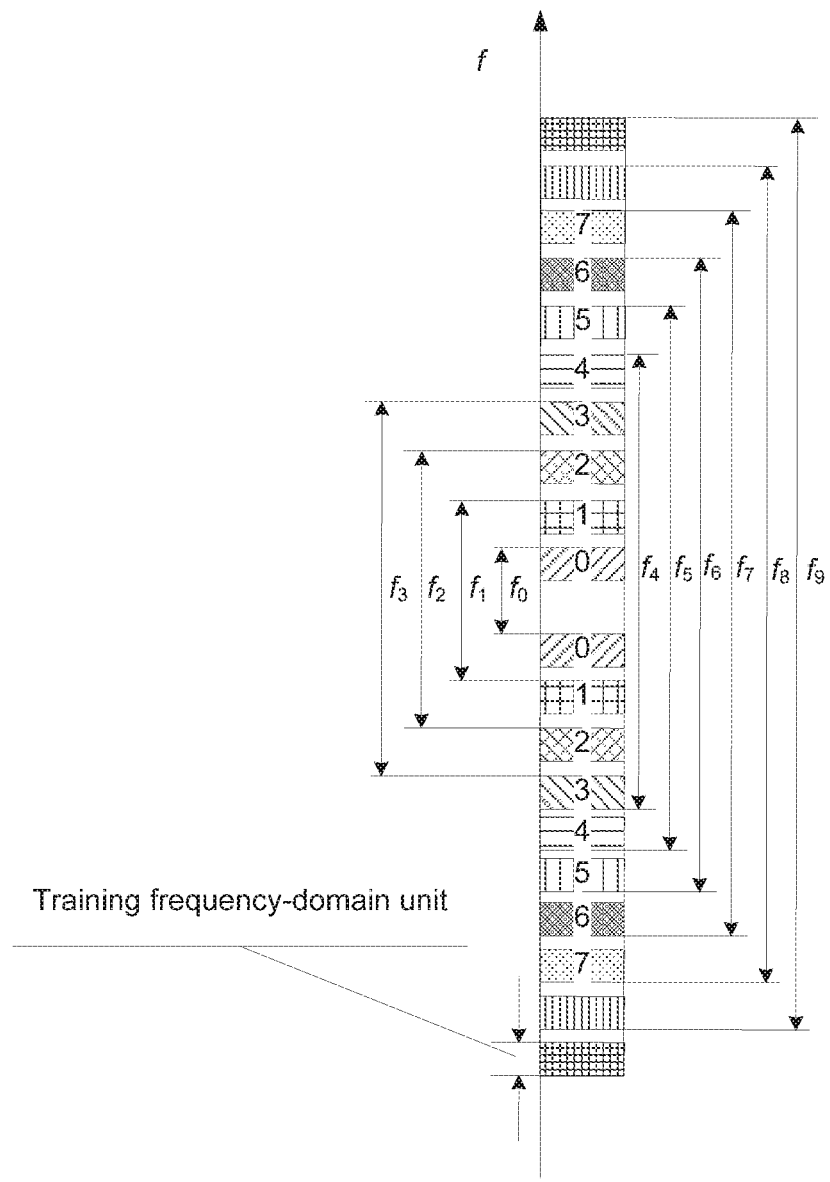
FIG. 9 is a diagram of beam training units in a frequency-domain differential manner-based beam identification method according to embodiment 5 of the present disclosure.

In the embodiment, it is supposed that a maximum beam number supported by a Node B is N, 2N training frequency-domain units are divided on frequency-domain resources, the 2N training frequency-domain units occupy the same time-domain resource, and are periodically sent on the time domain, the 2N training frequency-domain units are divided into N group, each group includes two training frequency-domain units, each group of training frequency-domain units corresponds to a beam, a frequency-domain interval corresponding to the two training frequency-domain units in each group is different from those of the other groups, that is, each beam corresponds to a frequency-domain interval, there are totally N different frequency-domain intervals, and the N frequency-domain intervals corresponding to the N groups of training frequency-domain units are recorded as $f_0 \sim f_{N-1}$ respectively. As shown in FIG. 9, for example, N=10, there are totally 20 (10 groups of) training frequency-domain units on the frequency domain, and training frequency-domain units in the same box shade in FIG. 9 form a group.

For a transmitter, i.e. the Node B, before sending beam training signals, the Node B determines the number, supposed to be M, of beams to be sent at first, M≤N, and then selects M groups of training frequency-domain units from the N groups of training frequency-domain units, wherein each group of training frequency-domain units corresponds to a beam, and only one beam training signal is sent on each training frequency-domain unit, so that each beam corresponds to different frequency-domain intervals. As shown in FIG. 9, M=8, the middle 8 groups of training frequency-domain units are selected to send the beam training signals, and numbers on the training time-domain units represent beam indexes. Here, a specific processing process of determining the number of the beams to be sent by the Node B is not a concern in the present disclosure.

For a receiver, i.e. a terminal, the terminal performs related peak detection on the beam training signals on the N groups of training frequency-domain units respectively to find a group with optimal receiving performance, and then feeds back a detection result to the Node B.

Wherein, if the terminal acquires a corresponding relationship between a frequency-domain interval and a beam index in advance, the terminal may find a beam index corresponding to the frequency-domain interval of the selected group of training frequency-domain units according to the acquired corresponding relationship between the frequency-domain interval and the beam index, and feed back the found beam index to the Node B. For example, as shown in FIG. 9, if the detected frequency-domain interval of the selected group of training frequency-domain units is equal to $f_3$, it may be obtained that the corresponding beam index is 3 according to the acquired corresponding relationship between the frequency-domain interval and the beam index, the terminal feeds back the beam index 3 to the Node B, and the Node B acquires an optimal downlink sending beam for the terminal after correctly receiving the feedback of the terminal.

If the terminal does not acquire the corresponding relationship between the frequency-domain interval and the beam index in advance, the terminal is required to feed back information capable of identifying the beam index, for example: feed back the frequency-domain interval of the selected group of training frequency-domain units, or feed back an index number of the frequency-domain interval of the selected group of training frequency-domain units and the like; correspondingly, the Node B finds the beam index corresponding to the selected group of training frequency-domain units according to the fed back content after receiving the feedback of the terminal, in such a manner, the Node B obtains the optimal downlink sending beam for the terminal.

From the above, according to the beam identification method in the embodiment, the Node B sends the beam training signals at different frequency-domain intervals, and the terminal feeds back the indication information capable of identifying the frequency-domain interval corresponding to the selected group of training frequency-domain units to the Node B to enable the Node B to obtain the optimal downlink sending beam corresponding to the terminal, so that the beam identification method of the embodiment may be considered as a frequency-domain differential manner-based beam identification method.

Embodiment 6

In the embodiment, it is supposed that a maximum beam number supported by a Node B is N, beam training is periodically performed, each beam adopts the same period, J training time-domain units are divided in a period, and I training frequency-domain units are divided on frequency-domain resources, so that totally I*J beam training units are obtained, and it is necessary to ensure I*J≥N. For example, as shown in FIGS. 10, N=12, I=6 and J=2.

Adjacent beam training units in a period may be continuous on both the time domain and the frequency domain, and may also be spaced by certain time-domain or frequency-domain intervals.

For a transmitter, i.e. the Node B, before sending beam training signals, the Node B determines the number, supposed to be M, of beams to be sent at first, M≤N, and then selects M beam training units from the I*J beam training units, beam training signals in each direction being sent on a training frequency-domain unit. As shown in FIG. 10, M=N=12, each beam training unit corresponds to a beam, and numbers on the beam training units in FIG. 10 represent beam indexes. Here, a specific processing process of determining the number of the beams to be sent by the Node B is not a concern in the present disclosure.

For a receiver, i.e. a terminal, the terminal performs related peak detection on the beam training signals on the N beam training units to find a beam with optimal receiving performance, determines as the beam as a selected beam, and feeds back indication information about the selected beam to the Node B, wherein the optimal beam may be uniquely determined according to its time-domain position and frequency-domain position.

Wherein, if the terminal acquires a corresponding relationship between a time-frequency position of a beam training unit and a beam index in advance, the terminal may find a beam index corresponding to a time-frequency position of the selected beam according to the acquired corresponding relationship between the time-frequency position of the beam training unit and the beam index, and feed back the found beam index to the Node B. For example, as shown in FIG. 10, if the terminal detects that the selected beam is positioned between $f_b$ and $f_c$ on the frequency domain and positioned between $t_b$ and $t_c$ on the time domain, it may be obtained that the corresponding beam index is 3 according to the acquired corresponding relationship between the time-frequency position of the beam training unit and the beam index, the terminal feeds back the beam index 3 to the Node B, and the Node B acquires an optimal downlink sending beam for the terminal after correctly receiving the feedback of the terminal.

If the terminal does not acquire the corresponding relationship between the time-frequency position of the beam training unit and the beam index in advance, the terminal is required to feed back information capable of identifying the beam index, for example: feed back a serial number of the beam training unit corresponding to the selected beam, or feed back a time-frequency position of the beam training unit corresponding to the selected beam and the like; correspondingly, the Node B finds the beam index corresponding to the selected beam according to the fed back content after receiving the feedback of the terminal, in such a manner, the Node B obtains the optimal downlink sending beam for the terminal.

From the above, according to the beam identification method in the embodiment, the Node B sends the beam training signals at different time-frequency positions, and the terminal feeds back the indication information capable of identifying the time-frequency position corresponding to the selected beam to the Node B to enable the Node B to obtain the optimal downlink sending beam corresponding to the terminal, so that the beam identification method of the embodiment may be considered as a time division and frequency division manner-based beam identification method.

Embodiment 7

In the embodiment, it is supposed that a maximum beam number supported by a

Figure 11:
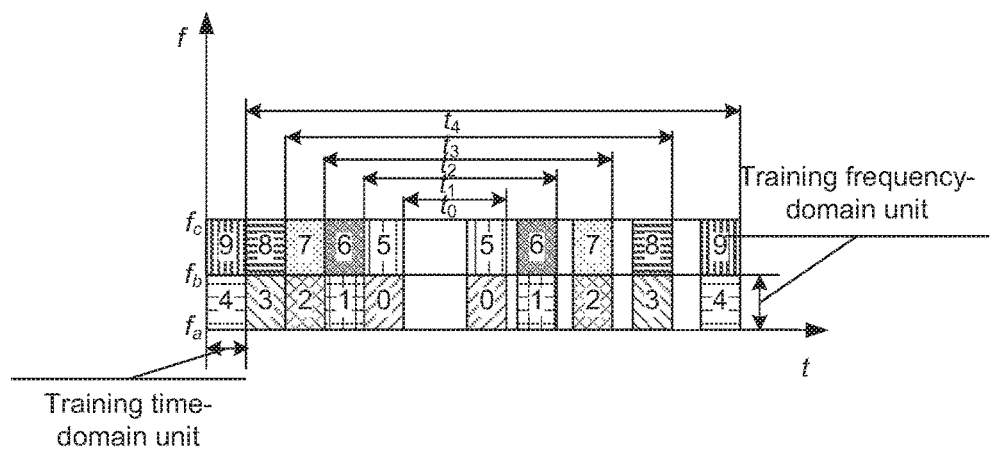
FIG. 11 is a diagram of beam training units in a frequency division and time-domain differential manner-based beam identification method according to embodiment 7 of the present disclosure.

Node B is N, beam training is periodically performed, and in a period, 2J training time-domain units are divided on the time domain and I training frequency-domain units are divided on the frequency domain, so that totally 2J*I beam training units are obtained. The 2J*I beam training units are divided into I*J groups, each group includes two beam training units, and there are totally I*J beam training unit groups; and a time-domain interval of two beam training units in each group of beam training units with the same training frequency-domain unit is different from time-domain intervals of the two beam training units in any other groups, so that there are totally J different time-domain intervals, the time-domain intervals being recorded as $t_0 \sim t_{J-1}$ respectively. For example, as shown in FIG. 11, N=12, I=2, J=6, and two beam training units in the same box shade in FIG. 11 forms a group.

Adjacent beam training units in a period may be continuous on both the time domain and the frequency domain, and may also be spaced by certain time-domain or frequency-domain intervals.

For a transmitter, i.e. the Node B, before sending beam training signals, the Node B determines the number, supposed to be M, of beams to be sent at first, M≤N, and then selects M beam training unit group from the I*J beam training unit groups, each beam training unit group corresponding to a beam and beam training signals in each direction being sent on a beam training unit group. As shown in FIG. 11, M=N=12, and numbers on the beam training units represent beam indexes. Here, a specific processing process of determining the number of the beams to be sent by the Node B is not a concern in the present disclosure.

For a receiver, i.e. a terminal, the terminal may execute a beam training process before a downlink synchronization process, and may also simultaneously execute the beam training process and the downlink synchronization process. The terminal performs related peak detection on the beam training signals on two training frequency-domain units respectively, judges whether a time difference between reception of two related peaks is equal to the predefined time-domain intervals, i.e. one of $t_0 \sim t_{N-1}$, after detecting the two related peaks, determines that a detection result is wrong and performs redetection if NO, and determines that the detection result is correct if YES. For example, as shown in FIG. 11, the terminal judges whether the time difference between reception of the two related peaks is equal to one of $t_0 \sim t_4$, determines that the detection result is wrong and performs redetection if NO, and determines that the detection result is correct if YES. The terminal determines the current beam of which the detection result is correct as a selected beam, and feeds back indication information about the selected beam to the Node B.

Wherein, if the terminal acquires a corresponding relationship between a frequency-domain position and time-domain interval of a beam training unit and a beam index in advance, the terminal may find a beam index corresponding to the time difference between reception of the two related peaks according to the acquired corresponding relationship between the frequency-domain position and time-domain interval of the beam training unit and the beam index, and feed back the found beam index to the Node B. For example, as shown in FIG. 11, if the two related peaks detected by the terminal is positioned between $f_b$ and $f_c$ on the frequency domain and the time-domain interval is equal to $t_2$, it may be obtained that the corresponding beam index is 7 according to the acquired corresponding relationship between the frequency-domain position and time-domain interval of the beam training unit and the beam index, the terminal feeds back the beam index 7 to the Node B, and the Node B acquires an optimal downlink sending beam for the terminal after correctly receiving the feedback of the terminal.

If the terminal does not acquire the corresponding relationship between the frequency-domain position and time-domain interval of the beam training unit and the beam index in advance, the terminal is required to feed back information capable of identifying the beam index, for example: feed back information such as a frequency-domain position and time-domain interval of the corresponding beam training unit; correspondingly, the Node B finds the corresponding beam index according to the fed back content after receiving the feedback of the terminal, in such a manner, the Node B obtains the optimal downlink sending beam for the terminal.

From the above, according to the beam identification method in the embodiment, the Node B sends the beam training signals at different frequency-domain positions and time-domain intervals, and the terminal feeds back the indication information capable of identifying a time-frequency position corresponding to the selected beam to the Node B to enable the Node B to obtain the optimal downlink sending beam corresponding to the terminal, so that the beam identification method of the embodiment may be considered as a frequency division and time-domain differential manner-based beam identification method.

Figure 12:
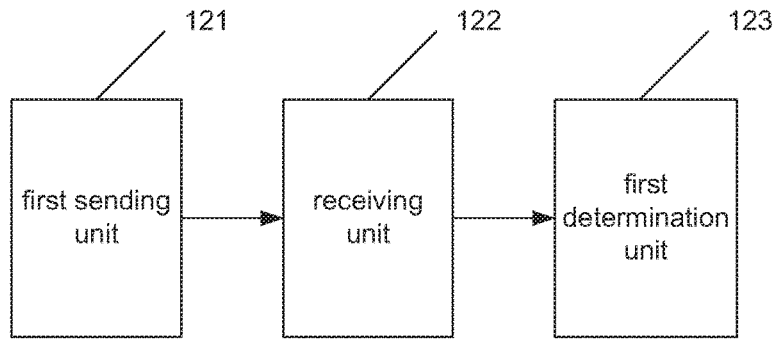
FIG. 12 is a structure diagram of a Node B in an MIMO beamforming communication system according to an embodiment of the present disclosure.

A Node B in an MIMO beamforming communication system in an embodiment of the present disclosure, as shown in FIG. 12, includes: a first sending unit 121, a receiving unit 122 and a first determination unit 123, wherein the first sending unit 121 is configured to send multiple beam training signals to a terminal, each beam training signal corresponding to a beam and the beams covering different directions; and the receiving unit 122 is configured to receive indication information, fed back by the terminal, about a selected beam; and the first determination unit 123 is configured to determine the beam configured to send data information according to the fed-back indication information about the selected beam.

Wherein, the beam training signals refer to: signals bearing beam, they may have other names, for example: beam testing signals, and signals capable of achieving a purpose the same as that achieved by the beam training signals in the present disclosure shall fall within the scope of protection of the present disclosure.

The operation that the multiple beam training signals are sent specifically includes that:

the multiple beam training signals are sent in at least one of a time division manner, a frequency division manner, a time-domain differential manner and a frequency-domain differential manner, wherein the operation that the multiple beam training signals are sent in the time division manner is specifically implemented as follows:

the multiple beam training signals are sent at different time-domain positions, each beam corresponding to a time-domain position;

the operation that the multiple beam training signals are sent in the frequency division manner is specifically implemented as follows:

the multiple beam training signals are sent at different frequency-domain positions, each beam corresponding to a frequency-domain position;

the operation that the multiple beam training signals are sent in the time-domain differential manner is specifically implemented as follows:

the multiple beam training signals are sent in different time-domain intervals, each beam corresponding to a time-domain interval; and the operation that the multiple beam training signals are sent in the frequency-domain differential manner is specifically implemented as follows:

the multiple beam training signals are sent in different frequency-domain intervals, each beam corresponding to a frequency-domain interval.

Wherein, the operation that the multiple beam training signals are sent in different time-domain intervals specifically includes that:

the multiple beam training signals are periodically sent, each beam training signal corresponding to a sending period; or, the beam training signals corresponding to each beam are sent twice in a training period, each beam training signal sent twice being sent at a time-domain interval and different beams corresponding to different time-domain intervals.

Here, the time-domain intervals between different beams are unequal to the training period and the time-domain interval corresponding to any beam.

The number of the beams corresponding to the sent beam training signals is smaller than or equal to a maximum beam number supported by the Node B; correspondingly, the number of the time-domain positions configured to send the beam training signals is smaller than or equal to the maximum beam number supported by the Node B; the number of the frequency-domain positions configured to send the beam training signals is smaller than or equal to the maximum beam number supported by the Node B; the number of the time-domain intervals configured to send the beam training signals is smaller than or equal to the maximum beam number supported by the Node B; and the number of the frequency-domain intervals configured to send the beam training signals is smaller than or equal to the maximum beam number supported by the Node B.

Here, during a practical application, the manner adopted for sending the beam training signals by the Node B may be determined as required.

The indication information about the selected beam may specifically be: a beam index corresponding to the selected beam or information capable of identifying the beam index corresponding to the selected beam, wherein the information capable of identifying the beam index corresponding to the selected beam includes: at least one of a time-domain position index, a frequency-domain position index, a time-domain interval index and a frequency-domain interval index. Specifically, when the multiple beam training signals are sent in the time division manner, the information capable of identifying the beam index corresponding to the selected beam is a time-domain position index; when the multiple beam training signals are sent in the frequency division manner, the information capable of identifying the beam index corresponding to the selected beam is a frequency-domain position index; when the multiple beam training signals are sent in the time-domain differential manner, the information capable of identifying the beam index corresponding to the selected beam is a time-domain interval index; when the multiple beam training signals are sent in the frequency-domain differential manner, the information capable of identifying the beam index corresponding to the selected beam is a frequency-domain interval index; and when the multiple beam training signals are sent in the time division manner and the frequency division manner, the information capable of identifying the beam index corresponding to the selected beam is a time-domain position index and a frequency-domain position index, and so on.

When the indication information about the selected beam is the information capable of identifying the beam index corresponding to the selected beam, the operation that the beam configured to send the data information is determined according to the indication information, fed back by the terminal, about the selected beam specifically includes that:

the beam configured to send the data information is determined according to a stored corresponding relationship between information capable of identifying a beam index corresponding to a selected beam and the beam index.

Wherein, the selected beam may be a beam with optimal receiving performance and the like; here, the beam with the optimal receiving performance may be determined as required; and a specific processing process of determining the beam with the optimal receiving performance is a common technical means adopted by those skilled in the art, and will not be elaborated.

Here, during a practical application, the first sending unit and the receiving unit may be implemented by a transceiver of the Node B, and the first determination unit may be implemented by a Central Processing Unit (CPU), Digital Signal Processor (DSP) or Field-Programmable Gate Array (FPGA) of the Node B.

Figure 13:
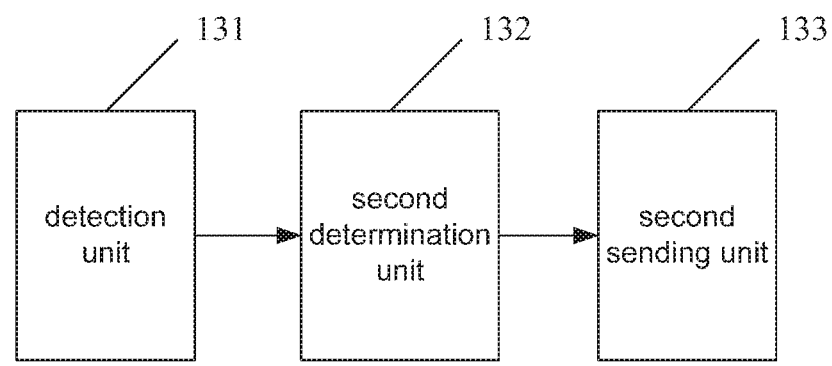
FIG. 13 is a structure diagram of a terminal in an MIMO beamforming communication system according to an embodiment of the present disclosure.

A terminal in an MIMO beamforming communication system in an embodiment of the present disclosure, as shown in FIG. 13, includes: a detection unit 131, a second determination unit 132 and a second sending unit 133, wherein the detection unit 131 is configured to detect beam training signals;

the second determination unit 132 is configured to determine a selected beam according to a detection result of the beam training signals; and the second sending unit 133 is configured to feed back indication information about the selected beam to a Node B.

Wherein, the beam training signals refer to: signals bearing beam, they may have other names, for example: beam testing signals, and signals capable of achieving a purpose the same as that achieved by the beam training signals in the present disclosure shall fall within the scope of protection of the present disclosure.

Here, during a practical application, the terminal acquires a manner for determining the selected beam in advance.

The indication information about the selected beam may specifically be: a beam index corresponding to the selected beam or information capable of identifying the beam index corresponding to the selected beam, wherein the information capable of identifying the beam index corresponding to the selected beam includes: at least one of a time-domain position index, a frequency-domain position index, a time-domain interval index and a frequency-domain interval index.

Wherein, the selected beam may be a beam with optimal receiving performance and the like; here, the beam with the optimal receiving performance may be determined as required; and a specific processing process of determining the beam with the optimal receiving performance is a common technical means adopted by those skilled in the art, and will not be elaborated.

Here, during a practical application, the detection unit and the second sending unit may be implemented by a transceiver of the terminal, and the second determination unit may be implemented by a CPU, DSP or FPGA of the terminal.

Figure 14:
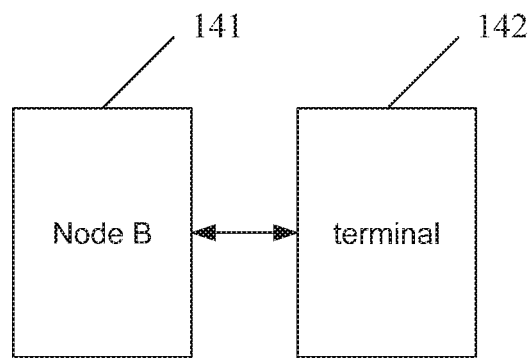
FIG. 14 is a structure diagram of a beam identification system in an MIMO beamforming communication system according to an embodiment of the present disclosure.

A beam identification system in an MIMO beamforming communication system in an embodiment of the present disclosure, as shown in FIG. 14, includes: a Node B 141 and a terminal 142, wherein the Node B 141 is configured to send multiple beam training signals to the terminal 142, each beam training signal corresponding to a beam and the beams covering different directions, and determine a beam configured to send data information according to indication information, fed back by the terminal 142, about the selected beam; and the terminal 142 is configured to detect the beam training signals, determine the selected beam according to a detection result of the beam training signals and feed back the indication information about the selected beam to the Node B 141.

Specifically, a first sending unit of the Node B 141 sends the multiple beam training signals to the terminal 142; each beam training signal corresponds to a beam, and the beams cover different directions; a detection unit of the terminal 142 detects the beam training signals, a second determination unit of the terminal 142 determines the selected beam according to the detection result of the beam training signals, and a second sending unit of the terminal 142 feeds back the indication information about the selected beam to the Node B 141; a receiving unit of the Node B 141 receives the indication information, fed back by the terminal 142, about the selected beam; and a first determination unit of the Node B 141 determines the beam configured to send the data information according to the fed back indication information about the selected beam.

Here, the beam training signals refer to: signals bearing beam, they may have other names, for example: beam testing signals, and signals capable of achieving a purpose the same as that achieved by the beam training signals in the present disclosure shall fall within the scope of protection of the present disclosure.

The operation that the Node B 141 sends the multiple beam training signals specifically includes that:

the Node B 141 sends the multiple beam training signals in at least one of a time division manner, a frequency division manner, a time-domain differential manner and a frequency-domain differential manner, wherein the operation that the Node B 141 sends the multiple beam training signals in the time division manner is specifically implemented as follows:

the Node B 141 sends the multiple beam training signals at different time-domain positions, each beam corresponding to a time-domain position;

the operation that the Node B 141 sends the multiple beam training signals in the frequency division manner is specifically implemented as follows:

the Node B 141 sends the multiple beam training signals at different frequency-domain positions, each beam corresponding to a frequency-domain position;

the operation that the Node B 141 sends the multiple beam training signals in the time-domain differential manner is specifically implemented as follows:

the Node B 141 sends the multiple beam training signals in different time-domain intervals, each beam corresponding to a time-domain interval; and the operation that the Node B 141 sends the multiple beam training signals in the frequency-domain differential manner is specifically implemented as follows:

the Node B 141 sends the multiple beam training signals in different frequency-domain intervals, each beam corresponding to a frequency-domain interval.

Wherein, the operation that the Node B 141 sends the multiple beam training signals in different time-domain intervals specifically includes that:

the Node B 141 periodically sends the multiple beam training signals, each beam training signal corresponding to a sending period; or, the beam training signals corresponding to each beam are sent twice in a training period, each beam training signal sent twice being sent at a time-domain interval and different beams corresponding to different time-domain intervals.

Here, the time-domain intervals between different beams are unequal to the training period and the time-domain interval corresponding to any beam, so that mistaken detection of the terminal 142 may be effectively avoided.

The number of the beams corresponding to the beam training signals sent by the Node B 141 is smaller than or equal to a maximum beam number supported by the Node B; correspondingly, the number of the time-domain positions configured to send the beam training signals is smaller than or equal to the maximum beam number supported by the Node B 141; the number of the frequency-domain positions configured to send the beam training signals is smaller than or equal to the maximum beam number supported by the Node B 141; the number of the time-domain intervals configured to send the beam training signals is smaller than or equal to the maximum beam number supported by the Node B 141; and the number of the frequency-domain intervals configured to send the beam training signals is smaller than or equal to the maximum beam number supported by the Node B 141.

Here, during a practical application, the manner adopted for sending the beam training signals by the Node B 141 may be determined as required.

The operation that the terminal 142 determines the selected beam according to the detection result of the beam training signals specifically includes:

Here, during a practical application, the terminal 142 acquires the manner adopted for sending the beam training signals by the Node B in advance, and further acquires which manner a manner should be adopted to determine the selected beam.

The indication information about the selected beam may specifically be: a beam index corresponding to the selected beam or information capable of identifying the beam index corresponding to the selected beam, wherein the information capable of identifying the beam index corresponding to the selected beam includes: at least one of a time-domain position index, a frequency-domain position index, a time-domain interval index and a frequency-domain interval index.

Here, when the indication information about the selected beam is the information capable of identifying the beam index corresponding to the selected beam, the operation that the Node B determines the beam configured to send the data information according to the fed back indication information about the selected beam specifically includes that:

the Node B 141 determines the beam configured to send the data information according to a stored corresponding relationship between information capable of identifying a beam index corresponding to a selected beam and the beam index.

Wherein, the selected beam may be a beam with optimal receiving performance and the like; here, the beam with the optimal receiving performance may be determined as required; and a specific processing process of determining the beam with the optimal receiving performance is a common technical means adopted by those skilled in the art, and will not be elaborated.

Those skilled in the art should know that the embodiment of the present disclosure may be provided as a method, a system or a computer program product. Therefore, the present disclosure may adopt a form of pure hardware embodiment, pure software embodiment and combined software and hardware embodiment. Moreover, the present disclosure may adopt a form of computer program product implemented on one or more computer-available storage media (including, but not limited to, a disk memory, an optical memory and the like) including computer-available program codes.

The present disclosure is described with reference to flow charts and/or block diagrams of the method, device (system) and computer program product according to the embodiment of the present disclosure. It should be understood that each flow and/or block in the flow charts and/or the block diagrams and combinations of the flows and/or blocks in the flow charts and/or the block diagrams may be implemented by computer program instructions. These computer program instructions may be provided for a universal computer, a dedicated computer, an embedded processor or a processor of other programmable data processing device to generate a machine, so that a device for realizing a function specified in one flow or more flows in the flow charts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or many flows in the flow charts and/or one block or many blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or many flows in the flow charts and/or one block or many blocks in the block diagrams are provided by the instructions executed on the computer or the other programmable data processing device.

The above is only the preferred embodiment of the present disclosure and not intended to limit the scope of protection of the present disclosure.

What is claimed is:

1. A beam identification method at a Node B side in a Multiple-Input Multiple-Output (MIMO) beamforming communication system, comprising:
    sending, by a Node B, multiple beam training signals to a terminal, each beam training signal corresponding to a beam and the beams covering different directions; and
    determining, by the Node B, a beam configured to send data information according to indication information, fed back by the terminal, about the selected beam;
    wherein the step of sending, by the Node B, the multiple beam training signals comprises:
    sending, by the Node B, the multiple beam training signals in at least one of a time division manner, a frequency division manner, a time-domain differential manner and a frequency-domain differential manner, wherein
    the step of sending the multiple beam training signals in the time division manner is implemented by:
    sending, by the Node B, the multiple beam training signals at different time-domain positions, each beam corresponding to a time-domain position;
    the step of sending the multiple beam training signals in the frequency division manner is implemented by:
    sending, by the Node B, the multiple beam training signals at different frequency-domain positions, each beam corresponding to a frequency-domain position;
    the step of sending the multiple beam training signals in the time-domain differential manner is implemented by:
    sending, by the Node B, the multiple beam training signals in different time-domain intervals, each beam corresponding to a time-domain interval; and
    the step of sending the multiple beam training signals in the frequency-domain differential manner is implemented by:
    sending, by the Node B, the multiple beam training signals in different frequency-domain intervals, each beam corresponding to a frequency-domain interval.

2. The method according to claim 1, wherein the step of sending, by the Node B, the multiple beam training signals in different time-domain intervals comprises:
    periodically sending, by the Node B, the multiple beam training signals, each beam training signal corresponding to a sending period; or,
    sending the beam training signals corresponding to each beam twice in a training period, each beam training signal sent twice being sent at a time-domain interval and different beams corresponding to different time-domain intervals.

3. The method according to claim 2, wherein the time-domain intervals between different beams are unequal to the training period and the time-domain interval corresponding to any beam.

4. The method according to claim 1, wherein the number of the beams corresponding to the beam training signals sent by the Node B is smaller than or equal to a maximum beam number supported by the Node B.

5. The method according to claim 4, wherein the indication information about the selected beam is a beam index corresponding to the selected beam, or is information capable of identifying the beam index corresponding to the selected beam.

6. The method according to claim 5, wherein the information capable of identifying the beam index corresponding to the selected beam comprises: at least one of a time-domain position index, a frequency-domain position index, a time-domain interval index and a frequency-domain interval index.

7. The method according to claim 6, wherein, when the indication information about the selected beam is the information capable of identifying the beam index corresponding to the selected beam, the step of determining the beam configured to send the data information according to the indication information, fed back by the terminal, about the selected beam comprises:
    determining, by the Node B, the beam configured to send the data information according to a stored corresponding relationship between information capable of identifying a beam index corresponding to a selected beam and the beam index.

8. The method according to claim 1, wherein the beam training signals refer to signals bearing beam.

9. A Node B in a Multiple-Input Multiple-Output (MIMO) beamforming communication system, comprising: a first sending unit, a receiving unit and a first determination unit, wherein
    the first sending unit is configured to send multiple beam training signals to a terminal, each beam training signal corresponding to a beam and the beams covering different directions; and
    the receiving unit is configured to receive indication information, fed back by the terminal, about a selected beam; and
    the first determination unit is configured to determine the beam configured to send data information according to the fed-back indication information about the selected beam;
    wherein the step that the multiple beam training signals are sent comprises that:
    the multiple beam training signals are sent in at least one of a time division manner, a frequency division manner, a time-domain differential manner and a frequency-domain differential manner, wherein
    the step that the multiple beam training signals are sent in the time division manner is implemented as follows:
    the multiple beam training signals are sent at different time-domain positions, each beam corresponding to a time-domain position;

the step that the multiple beam training signals are sent in the frequency division manner is implemented as follows:

the multiple beam training signals are sent at different frequency-domain positions, each beam corresponding to a frequency-domain position;

the step that the multiple beam training signals are sent in the time-domain differential manner is implemented as follows:

the multiple beam training signals are sent in different time-domain intervals, each beam corresponding to a time-domain interval; and the step that the multiple beam training signals are sent in the frequency-domain differential manner is implemented as follows:

the multiple beam training signals are sent in different frequency-domain intervals, each beam corresponding to a frequency-domain interval.

10. The Node B according to claim 9, wherein the number of the beams corresponding to the sent beam training signals is smaller than or equal to a maximum beam number supported by the Node B.

11. A non-transitory computer storage medium, comprising a set of instructions, the instructions being executed to cause at least one processor to execute the beam identification method at a Node B side in the Multiple-Input Multiple-Output (MIMO) beamforming communication system according to any one of claims 1, and 2-7.

* * * * *